(12) United States Patent
Mills

(10) Patent No.: US 7,954,301 B2
(45) Date of Patent: Jun. 7, 2011

(54) INTEGRATED MULTILAYER INSULATION

(75) Inventor: Gary Louis Mills, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 170 days.

(21) Appl. No.: 12/041,326

(22) Filed: Mar. 3, 2008

(65) Prior Publication Data

US 2010/0251653 A1    Oct. 7, 2010

Related U.S. Application Data

(60) Provisional application No. 60/895,349, filed on Mar. 16, 2007.

(51) Int. Cl.
*E04C 2/34* (2006.01)

(52) U.S. Cl. .................. 52/788.1; 428/76; 244/171.7

(58) Field of Classification Search ............... 52/782.1, 52/783.1, 784.14, 788.1, 793.1, 794.1; 428/68, 428/76, 120; 244/159.1, 171.7; 220/560.12, 220/560.13
See application file for complete search history.

(56) References Cited

U.S. PATENT DOCUMENTS

| | | | | |
|---|---|---|---|---|
| 3,616,139 A | * | 10/1971 | Jones | 428/118 |
| 3,649,426 A | * | 3/1972 | Gates | 428/68 |
| 3,799,056 A | * | 3/1974 | Colignon | 244/117 A |
| 3,884,646 A | | 5/1975 | Kenney | |
| 3,894,372 A | * | 7/1975 | Roberts et al. | 220/560.06 |
| 4,336,292 A | | 6/1982 | Blair | |
| 4,400,927 A | | 8/1983 | Wolde-Tinase | |
| 4,683,154 A | | 7/1987 | Benson et al. | |
| 4,707,393 A | * | 11/1987 | Vetter | 428/178 |
| 5,038,693 A | | 8/1991 | Kourtides et al. | |
| 5,100,725 A | * | 3/1992 | Pearson | 428/314.4 |
| 5,107,649 A | | 4/1992 | Benson et al. | |
| 5,157,893 A | | 10/1992 | Benson et al. | |
| 5,175,975 A | | 1/1993 | Benson et al. | |
| 5,230,941 A | * | 7/1993 | Hollander et al. | 428/116 |

(Continued)

FOREIGN PATENT DOCUMENTS

GB    2291672 A    1/1996

OTHER PUBLICATIONS

Murrill, Mary Beth, Solar System's Best-Outfitted Spacecraft Dons Its Thermal Cloak, California Institute of Technology Press Release, Jan. 3, 1997, NASA, Pasadena, California, available at www.jpl.nasa.gov/releases/97/csblank.html.

(Continued)

*Primary Examiner* — Jeanette E Chapman
*Assistant Examiner* — Daniel Kenny
(74) *Attorney, Agent, or Firm* — Sheridan Ross P.C.

(57) ABSTRACT

A multilayer insulation with an array of rigid posts is provided. In particular, the posts are comprised of multiple post elements that are interconnected to radiation shields or sheets comprising the layers of the integrated multi-layer insulation structure. The post elements maintain spacing between adjacent sheets, thus maintaining a volume between the sheets. The post elements within a post can be attached to one another to form an integrated post structure. Moreover, neighboring posts can be interconnected to one another by beams. The post elements can also be configured so that, when the IMLI structure is not subjected to atmospheric pressure, the elements within a post are separated from one another to form gaps, thereby reducing heat transfer between layers.

22 Claims, 6 Drawing Sheets

U.S. PATENT DOCUMENTS

| | | | | |
|---|---|---|---|---|
| 5,246,759 | A | * | 9/1993 | Keller .............................. 428/74 |
| 5,270,092 | A | * | 12/1993 | Griffith et al. .................. 428/69 |
| 5,318,108 | A | | 6/1994 | Benson et al. |
| 5,429,851 | A | * | 7/1995 | Sallee ............................ 428/71 |
| 5,433,056 | A | | 7/1995 | Benson et al. |
| 5,489,321 | A | | 2/1996 | Tracy et al. |
| 5,502,292 | A | | 3/1996 | Pernicka et al. |
| 5,562,154 | A | | 10/1996 | Benson et al. |
| 5,580,620 | A | * | 12/1996 | Campbell et al. ............... 428/34 |
| 5,792,539 | A | * | 8/1998 | Hunter ............................ 428/72 |
| 5,966,888 | A | * | 10/1999 | Richardson .................... 52/580 |
| 6,280,814 | B1 | * | 8/2001 | Offermann et al. ............. 428/69 |
| 6,427,945 | B1 | | 8/2002 | Bansemir |
| 6,485,805 | B1 | | 11/2002 | Smith et al. |
| 6,739,104 | B2 | * | 5/2004 | Tokonabe et al. ............. 52/406.2 |
| 6,860,082 | B1 | * | 3/2005 | Yamamoto et al. .......... 52/794.1 |
| 7,001,656 | B2 | | 2/2006 | Maignan et al. |
| 7,111,752 | B2 | * | 9/2006 | Bucher et al. .............. 220/592.2 |
| 7,169,459 | B2 | * | 1/2007 | Lichodziejewski et al. .. 428/188 |
| 7,288,326 | B2 | | 10/2007 | Elzey et al. |
| 7,296,769 | B2 | * | 11/2007 | Hogenson et al. ......... 244/171.7 |
| 7,763,272 | B2 | * | 7/2010 | Offermann et al. ........... 424/426 |
| 2007/0089989 | A1 | | 4/2007 | Hoagland et al. |

OTHER PUBLICATIONS

Doody, Dave, "Typical Onboard Systems", Basics of Space Flight, Chapter 11, Feb. 2001, California Institute of Technology, NASA, Pasadena, California, available at www2.jpl.nasa.gov/basics/bsf11-4.html.

Stultz, James W. and Reeve, Ronald T., Test-Derived Effective Emittance for Cassini M1.] Blankets and Heat Loss Characteristics in the Vicinity of Seams, Abstract, Jun. 1995, California Institute of Technology, Pasadena, California.

Buchanan, Leslie and Buerger, Steve, High Performance MLI for Cryogenic Hardware, Mar. 13, 2003, Ball Aerospace & Technologies Corp., Boulder, CO.

Multi-layer Insulation, Wikipedia, last modified Feb. 1, 2008, Wikipedia Foundation, Inc., available at http://en.wikipedia.org/wiki/Multi-layer_insulation.

R. C. Getty, et al. "Experimental Evaluation of Some Selected Lightweight Superinsulation for Space Vehicles", Advances in Cryogenic Engineering, vol. 11, pp. 35-48 (1966).

M. Donabedian, et al. "Chapter 5: Insulation", *Satellite Thermal Control Handbook* (David G. Gilmore, ed.), The Aerospace Corporation, El Segundo, California, 24 pages (2002).

R. A. Mohling, et al. "Multilayer Insulation Thick Blanket Performance Demonstration, Final Report for the Period Sep. 23, 1986 to May 13, 1987", Ball Aerospace Systems Division, Prepared for Air Force Astronautics Laboratory, 248 pages (1987).

R. A. Mohling, et al. "Multilayer Insulation Thick Blanket Performance Demonstration, Final Report for the Period May 1987 to Dec. 1989", Ball Aerospace Systems Division, Prepared for Air Force Astronautics Laboratory, 131 pages (1990).

C. W. Keller, et al. "Final Report: Thermal Performance of Multilayer Insulations", Lockheed Missiles & Space Co., Prepared for the National Aeronautics and Space Administration, 446 pages (1974).

International Search Report and Written Opinion for International Application No. PCT/US2010/039352, mailed Aug. 24, 2010, 8 pages.

* cited by examiner

INTEGRATED MULTILAYER INSULATION

CROSS REFERENCE TO RELATED APPLICATIONS

This application claims the benefit of U.S. Provisional Patent Application Ser. No. 60/895,349, filed Mar. 16, 2007, the entire disclosure of which is hereby incorporated herein by reference.

FIELD

The present invention relates generally to thermal multilayer insulation (MLI).

BACKGROUND

Multilayer insulation (MLI) is used in applications requiring lightweight, high performance thermal insulation such as spacecraft, cryogenic tanks (dewars), cryogenic refrigerators, and instruments. MLI is typically used in a high vacuum ($<10^{-2}$ Pascal) where its performance exceeds alternative insulations by a factor of ten. However, the heat flow through the MLI is usually the major heat leak in cryogenic systems, so improvements in thermal performance would be desirable.

In cryogenic space propulsion applications, an insulation system that has high performance on orbit is required. However, the insulation must also provide adequate performance during pre-launch and launch to prevent frost. Also, the insulation is required to have a low mass, so that the payload capacity of the vehicle used to place the system in orbit is not unduly affected.

Current multilayer insulation consists of layers of metalized polymer sheets that are separated by fabric web or net, typically made of silk or polyester. The fabric net is often attached to the polymer sheets only at the edges. The thermal and mechanical contact between the net and sheets is not well controlled and therefore the conductance through the layers is difficult to predictably characterize. The net is a soft fiber material that has a high thermal contact conductance. Use of the insulation within the atmosphere requires a vacuum shell that does not put a compressive load on the insulation. Such a vacuum shell is inherently heavy (on the order of 10 kg/m^2) and difficult to make more lightweight because the shell has to resist buckling, which is governed by the material modulus of elasticity.

Other MLI technologies using a multi-layer honeycomb sandwich material for structures are light in weight and can be made very rigid relative to their weight. However, the insulation performance of such structures has been less than desired.

Accordingly, there is a need for a lightweight, high performance thermal insulation for critical missions such as NASA's next generation spacecraft for space exploration mission.

SUMMARY

Embodiments of the present invention provide a high performance integrated thermal insulation (IMLI) structure that includes a plurality of thermal radiation shields, also referred to herein as sheets. The sheets may comprise layers of metalized polymer material, separated by a rigid polymer structure that includes a plurality of support posts. The polymer structure can be thermally and structurally optimized to minimize the thermal conduction for the operating conditions. The structure is designed so that the insulation performance will not be significantly affected by compression effects due to gravity, allowing the low-gravity performance to be better predicted from ground testing. The insulation structure can be made strong enough to support a thin, lightweight, vacuum shell, which will greatly reduce the mass of the overall insulation system when operation in the atmosphere is required. The use of a rigid polymer structure may also facilitate the automation of the insulation fabrication and the handling of the insulation, reducing labor costs.

In accordance with embodiments of the present invention, the polymer structure is arranged so that support posts are comprised of staggered post elements, such that, for a given support post, not every space between adjacent sheets includes a post element for that support post. For example, the post elements of a given support post may be disposed between every other pair of alternate sheets. In addition, the spaces between adjacent sheets in which post elements from neighboring support posts are disposed may alternate, such that for a space in which a first support post has a first post element the second support post does not have a post element, and for a space in which the first support post does not have a first post element, the second support post does have a post element, and so on. This configuration, which introduces gaps between the individual post elements of the support posts, at least when the IMLI structure is subject to reduced atmospheric pressure, reduces thermal conductivity of the insulation structure as compared to an embodiment with post elements in each space between adjacent sheets. Alternatively, some post elements disposed between sheets may comprise partial post elements that allow gaps in their respective support posts to form when the IMLI structure is subject to reduced pressure. As yet another alternative, some or all of the support posts may include a complete post element in each space between the sheets, forming a continuous support structure even when the IMLI structure of system is in a vacuum.

In accordance with further embodiments of the present invention, beams within spaces between adjacent sheets may be provided to interconnect neighboring support posts to one another. By providing beams, the alignment of support posts and the included post elements can be better controlled, particularly during assembly and installation of the IMLI structure. If provided, beams can be disposed within one or more of the spaces between adjacent sheets. Also, the beams can be disposed between all of the posts within the IMLI structure, or can be segmented. An example of a segmented arrangement is to connect groups of four posts to one another by an arrangement of beams defining a square consisting of four posts. Moreover, connections between adjacent groups of posts using beams can be omitted, for example to facilitate cutting the IMLI structure to a desired size. Beams can be incorporated into embodiments that include continuous posts, or posts that have staggered post elements.

In accordance with other embodiments of the present invention, the post elements can be metalized in order to reduce the infrared absorption of the elements. If the post elements are metalized, gaps in the metalization, for example in the form of grooves or rings, may be provided to reduce or eliminate the conductive paths that would otherwise be created as a result of the metalization. Similarly, if beams are provided, they may also be metalized.

Additional features and advantages of embodiments of the present invention will become more readily apparent from the following description, particularly when taken together with the accompanying drawings.

DETAILED DESCRIPTION

Figure 1:
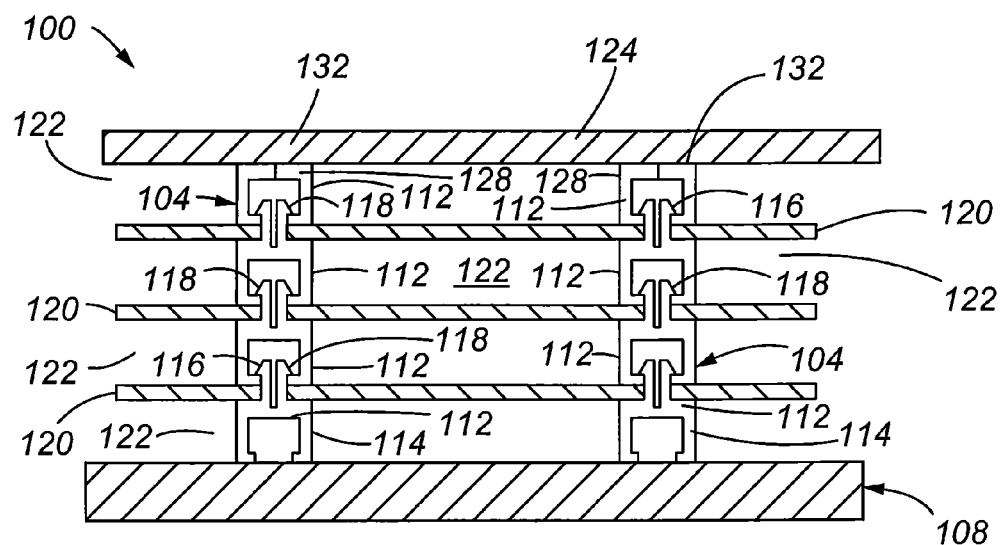
FIG. 1 is a cross section of an integrated multilayer insulation structure in accordance with embodiments of the present invention, in which the posts are attached to each other in a continuous in-line configuration.

The present invention is directed to an integrated multilayer insulation (IMLI) structure. As shown in FIG. 1, the IMLI structure 100 in accordance with embodiments of the present invention can include support posts 104 that each comprise a number of post elements 112. The support posts 104 generally support and maintain a space or separation 122 between adjacent thermal radiation shields (also referred to herein as sheets) 120. A base post element 114 in each support post 104 can be bonded or otherwise interconnected to a base structure or layer 108. The base layer 108 can be the radiation shield 120 comprised of the layer of polymer or other material immediately adjacent the item being insulated, or it can be the item being insulated. The support posts 104 can comprise a number of stacked post elements 112. The post elements 112 may be interconnected to one another to form a continuous support post 104 structure using mechanical attachments, fasteners, magnets, an adhesive or by polymer welding 116, either directly or with a portion of a sheet 120 between. An interconnection 116 comprising a mechanical attachment 118 can be any of a variety of designs, including the snap fastener shown in FIG. 1.

The mechanical attachment 118 can hold the post elements 112 loosely together, so that the mechanical attachment 118 does not add to the compressive force on the support posts 104. The mechanical attachment 118 traps individual sheets or layers comprising the radiation shields 120 of the IMLI structure 100 in between the post elements 112 of the support posts 104. The sheets 120 are thus spaced apart from one another. For example, in the embodiment illustrated in FIG. 1, the sheets 120 are spaced apart from one another by a distance equal to the height of the post elements 112 interposed between adjacent sheets 120. Alternatively, post elements 112 can be adhered to a sheet 120 opposite one another to create continuous support posts 104. The sheets 120 may be formed from a metalized polymer with a low emissitivity surface, such as silverized, goldized, aluminized MYLAR (polyethylene terephthalate polyester film) or KAPTON (polyimide film), or from a thin, low emissitivity metal such as aluminum or tungsten foil.

The post elements 112 may be fabricated from a molded polymer with low thermal conductivity, high compressive strength and hardness and low vacuum outgassing such as polyetherimide, polyimide, polyamide-imide, polyethyl ketone or wholly aromatic copolyesters. As an example, the post elements 112 may be formed from ULTEM (polyetherimide). The post element 112 surface that contacts a sheet 120 can be made with a rough texture, such as grooves, to minimize the contact conductance between post elements 112 of a post 104 and the sheet 120 and the post elements 120 of adjacent posts. Moreover, the use of support posts 104, which have a relatively limited contact area with the sheets 120 that are supported, can reduce conduction through the structure 100 as compared to structures using a honeycomb, web, net or other support structure. In accordance with embodiments of the present invention, the area of a sheet 120 surface that is in contact with a support post 104 is less than 3% of the total area of that sheet 120 surface. In accordance with other embodiments, the area of the sheet surface in contact with a support post 104 is less than 1% of the total area of that sheet 120 surface.

Embodiments of the invention can be used in connection with providing a vacuum insulation requiring all the spaces or volumes 122 between sheets 120 to be evacuated to a high vacuum (less than $10^{-2}$ Pa). If the integrated multilayer insulation structure 100 is to operate in the atmosphere, an air tight top or outer layer 124 (also referred to herein as hermetic layer 124) of thin metal, polymer or other material can be bonded or mechanically attached to the top or outermost surface of the support posts 104. As used herein, "top" or "outermost" surface of the support posts 104 refers to the surface of the top post elements 128, which are the layer or course of post elements 112 that are generally the farthest from the base layer or the item being insulated 108. This top surface of the support posts 104 may be formed using top post elements 128 that provide a suitable mounting surface 132.

The spaces between the sheets or layers 120 defining the volumes 122 can be evacuated to a high vacuum (less than $10^{-2}$ Pa) and the support posts 104 are put in compression due to the atmospheric pressure. A vent path 136 (see FIG. 3) through the interior of the posts 104 can be provided to facilitate the evacuation of the interior volumes of the posts 104. An IMLI insulation structure 100 with an integrated vacuum tight hermetic layer 124 in accordance with embodiments of the present invention can potentially be much lighter than a conventional MLI combined with a separate vacuum shell. Since the hermetic layer 124 is supported by the underlying insulation, it can be thinner and lower mass than conventional vacuum shells. In addition, the performance of the IMLI structure 100 is more predictable than conventional MLIs, as it is not as subject to any or as much performance variation under different compressive loads. For laminated insulators having comparable, numbers of layers of radiation shields and/or layer spacing, the IMLI insulation structure 100 would have a somewhat higher conductance than a conventional MLI if the IMLI were designed to withstand a one atmosphere load. An IMLI structure 100 in accordance with embodiments of the present invention can have significantly lower conductance than a conventional MLI when it does not need to be designed for a one atmosphere structural load.

Figure 2:
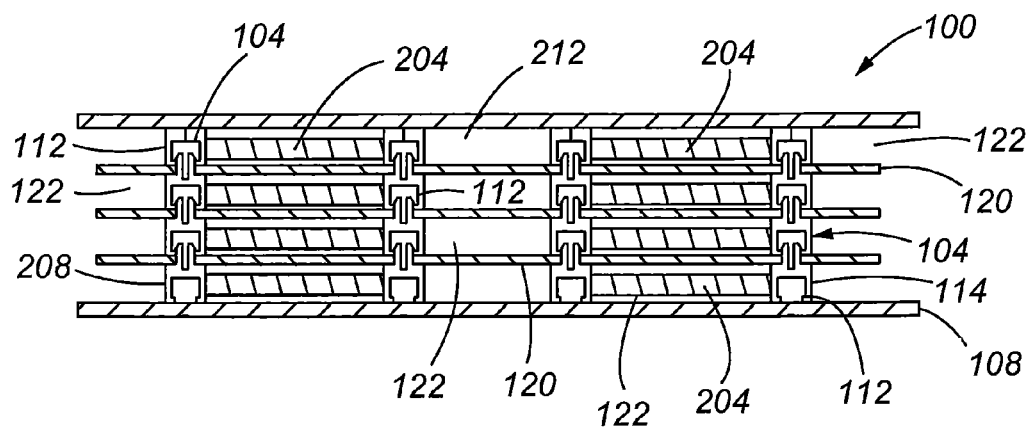
FIG. 2 is a cross section of an integrated multilayer insulation structure with beams between posts in accordance with embodiments of the present invention.
Figure 4:
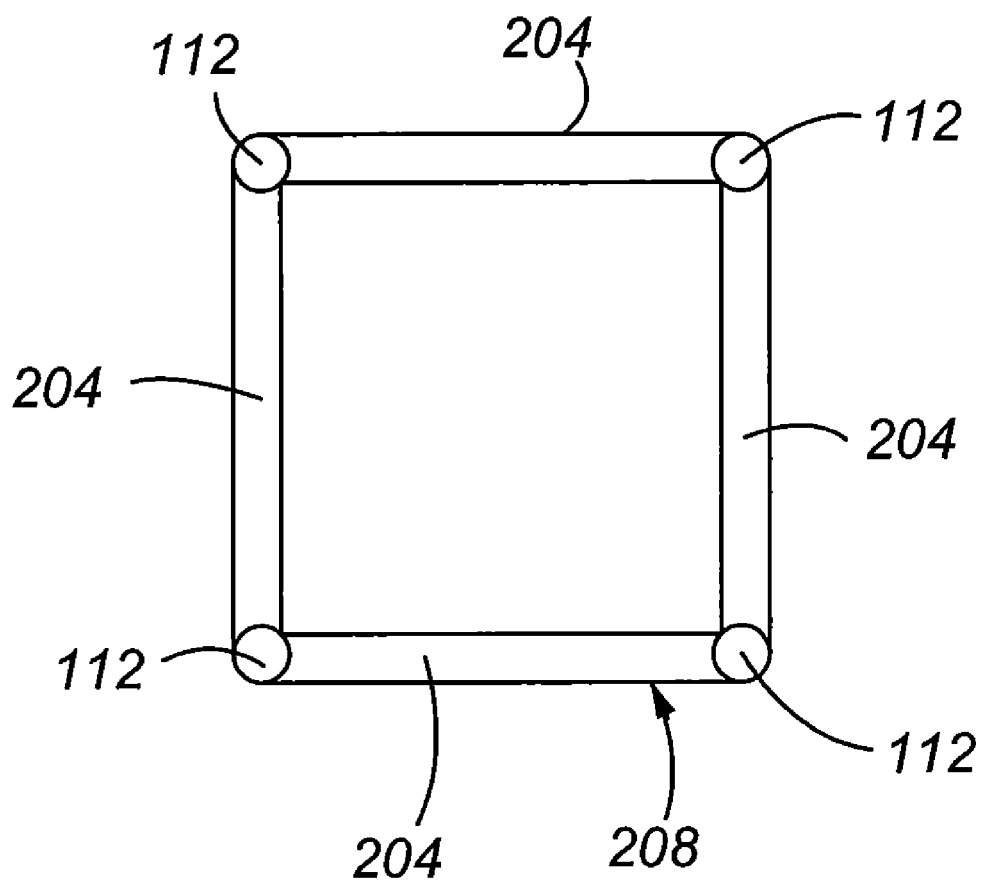
FIG. 4 is an illustration of a grid element in plan view in accordance with embodiments of the present invention.

FIG. 2 illustrates an IMLI structure 100 in accordance with other embodiments of the present invention. In particular, some or all of the support posts 104 are connected to adjacent support posts 104 by beams 204. In accordance with embodiments of the present invention, the beams 204 may be fabricated from the same material as the post elements 112. In accordance with still other embodiments of the present invention, the beams 204 may be provided as part of grid elements or integral beam and post structures 208 comprising four post elements 112 and four beams 204. An example integral beam and post structure 208 is illustrated in plan view in FIG. 4. The purpose of the beams 204 is to assist in the handling and alignment of the post elements 112 during assembly, and to reinforce the buckling strength of the support posts 104. The beams 204 can be arranged so they connect all the support posts 104 in a two-dimensional grid. Alternatively, the beams 204 can be arranged so there are gaps in the grid pattern 212, as shown, to reduce mass, provide flexibility to the structure 100 and to provide a place to more easily cut the assembly. The beams 204 can also be disposed within each volume 122 between adjacent sheets 120, or in less than every volume 122. As yet another alternative, groups of post elements 112 formed by interconnecting post elements 112 with beams 204 in a first number of the volumes 122 can be connected to other groups of post elements 112 by beams 204 in a second number of volumes 122, where the first number is greater than the second number, to provide greater control of the separation of adjacent support posts 104 while also facilitating cutting of the IMLI structure 100. Other arrangements or combinations of beams 204 and post elements 112 are also possible.

Figure 3:
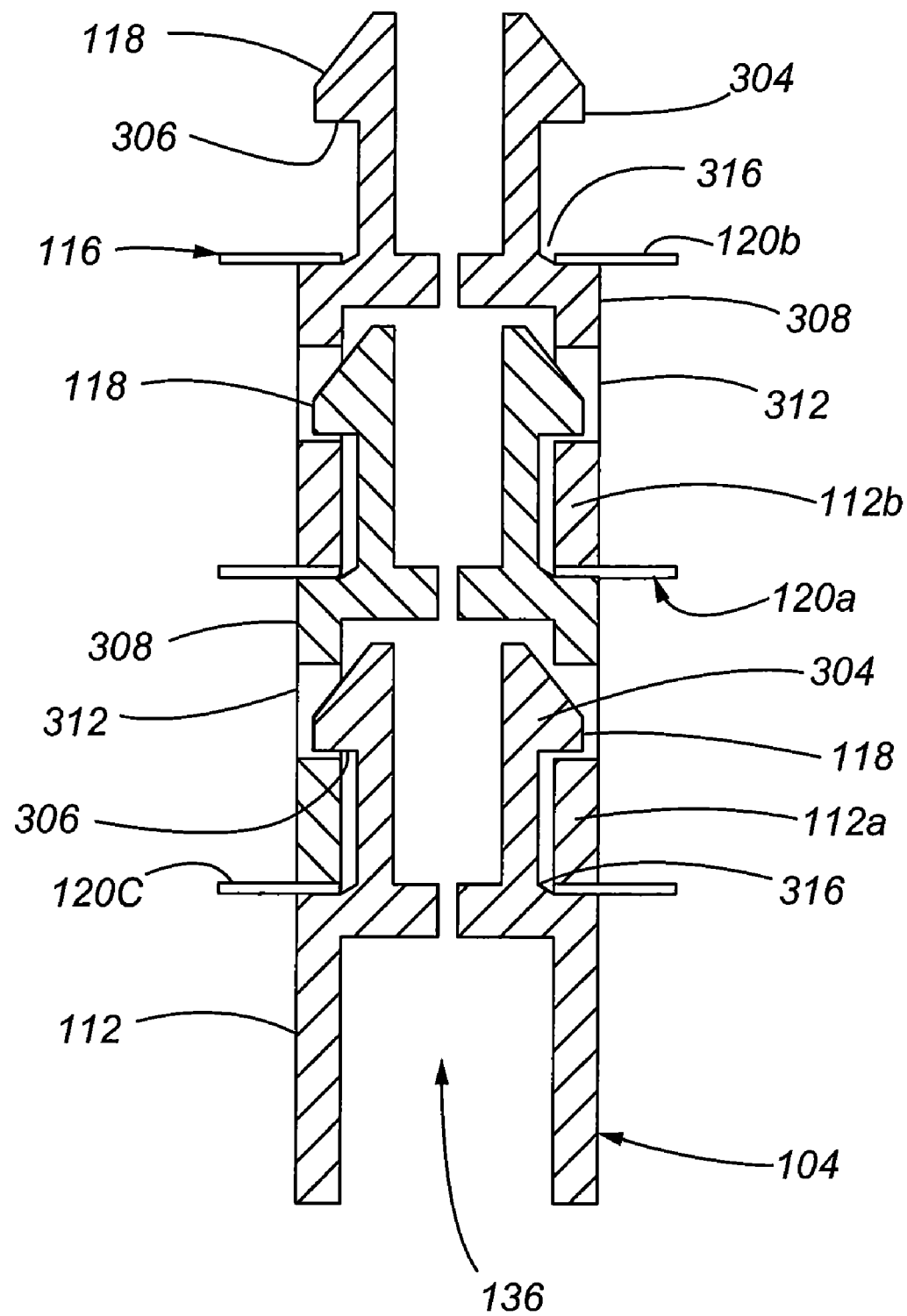
FIG. 3 is a cross section of a detail of a post design and mechanical fastener in accordance with embodiments of the present invention.

FIG. 3 shows a detail of a support post 104 design incorporating a snap fastener or mechanical attachment 118 that could be readily molded. According to this design, a post element 112 includes flexible tabs 304 with a flat locking surface 306 that are molded onto or integral with a round post element body 308. A through slot 312 that the tabs 304 on the adjacent post element 112 snap into so that the locking surface 306 engages the slot 312, may be provided to hold interconnected post elements 112 together. In accordance with further embodiments of the present invention, top post elements 128 for use at a top or outer layer of insulation may omit the tabs 304, and instead terminate at the top of the post element body 308 in an attachment or terminal surface (e.g., surface 132 shown in FIG. 1).

FIG. 3 also illustrates how the sheets 120 can be joined to the support posts 104. In particular, the sheets 120 may be provided with perforations 316 having a diameter that is greater than the distance between tabs 304, but less than the diameter of the post body 308. Accordingly, by placing the tabs 304 of a first post element 112 through a perforation 316 in a first sheet 120a, and by then joining the first post element 112a to a second post element 112b, the first sheet 120a can be trapped between the two post elements 112a and 112b and thus can be held at a desired spacing from other sheets 120b and 120c on either side of the first sheet 120a.

Additional mechanical methods exist for attaching the posts to each other. Hook and loop ("Velcro") or interlocking mushroom shaped attachments have been developed for other applications and could be used to attach stacked post elements 112. An alternative approach is to provide an interconnection 116 comprising magnets to enable the post elements 112 to be attached to each other magnetically. The post elements 112 could have magnets bonded into the ends that would be attracted to magnets of opposite polarity on other post elements 112. As still another alternative, each post element 112 can be bonded or adhered to the sheet or sheets 120 that it is in contact with. In addition, embodiments of the present invention can use sheets 120 that are not perforated. For example, embodiments in which post elements 112 are adhered to the sheets 120 can benefit from the use of unperforated sheets 120, as thermal radiation through the structure 100 can be reduced by eliminating perforations in the sheets 120.

Figure 5:
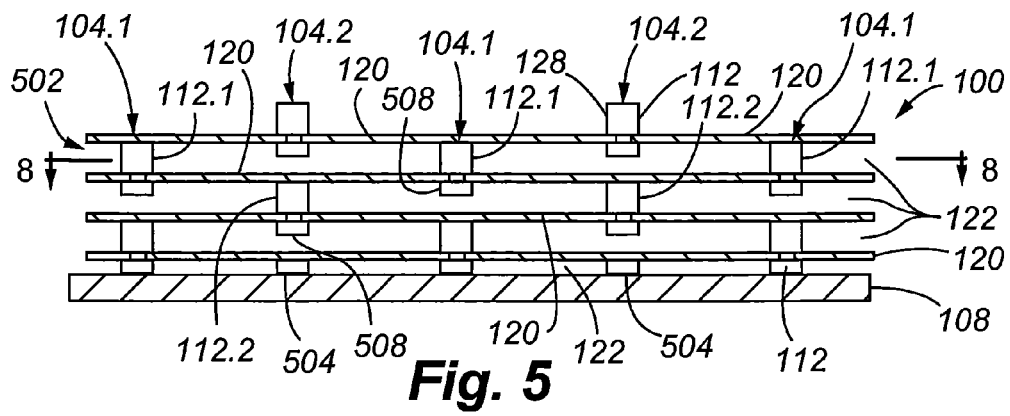
FIG. 5 is a cross section of an alternative embodiment of the invention in which the posts are configured with post elements that are in a staggered arrangement and are attached to the sheets but not to each other.

FIG. 5 illustrates in elevation an IMLI structure 100 in accordance with embodiments of the present invention in which the post elements 112 are configured in a staggered arrangement and are attached to the sheets 120 but not to each other, either directly or through intermediate sheets 120. In particular, a first set of support posts 104.1 includes post elements 112.1 that extend across the space between sheets 120 with respect to a first set of volumes 122, but that do not extend across a second set of volumes 122, at least when the top most post elements 112 are not subject to a compressive load. Similarly, a second set of support posts 104.2 include post elements 112.2 in the second set of volumes 122 but not the first set of volumes 122. This has the effect of reducing the thermal conductivity of the insulation structure 100, because conduction between post elements 112 included within a support post 104 is interrupted by the gaps between post elements 112, and the conduction path between posts is through the thin sheets. Accordingly, an application of an IMLI structure 100 in accordance with such embodiments is as a replacement for conventional multilayer insulation where a high vacuum can be obtained, such as through the provision of a vacuum shell or in the case of spaceflight, the ambient environment. As shown by the line 502 of support posts 104 visible in the figure, partial post elements 504 can be provided at intervals.

Figure 8:
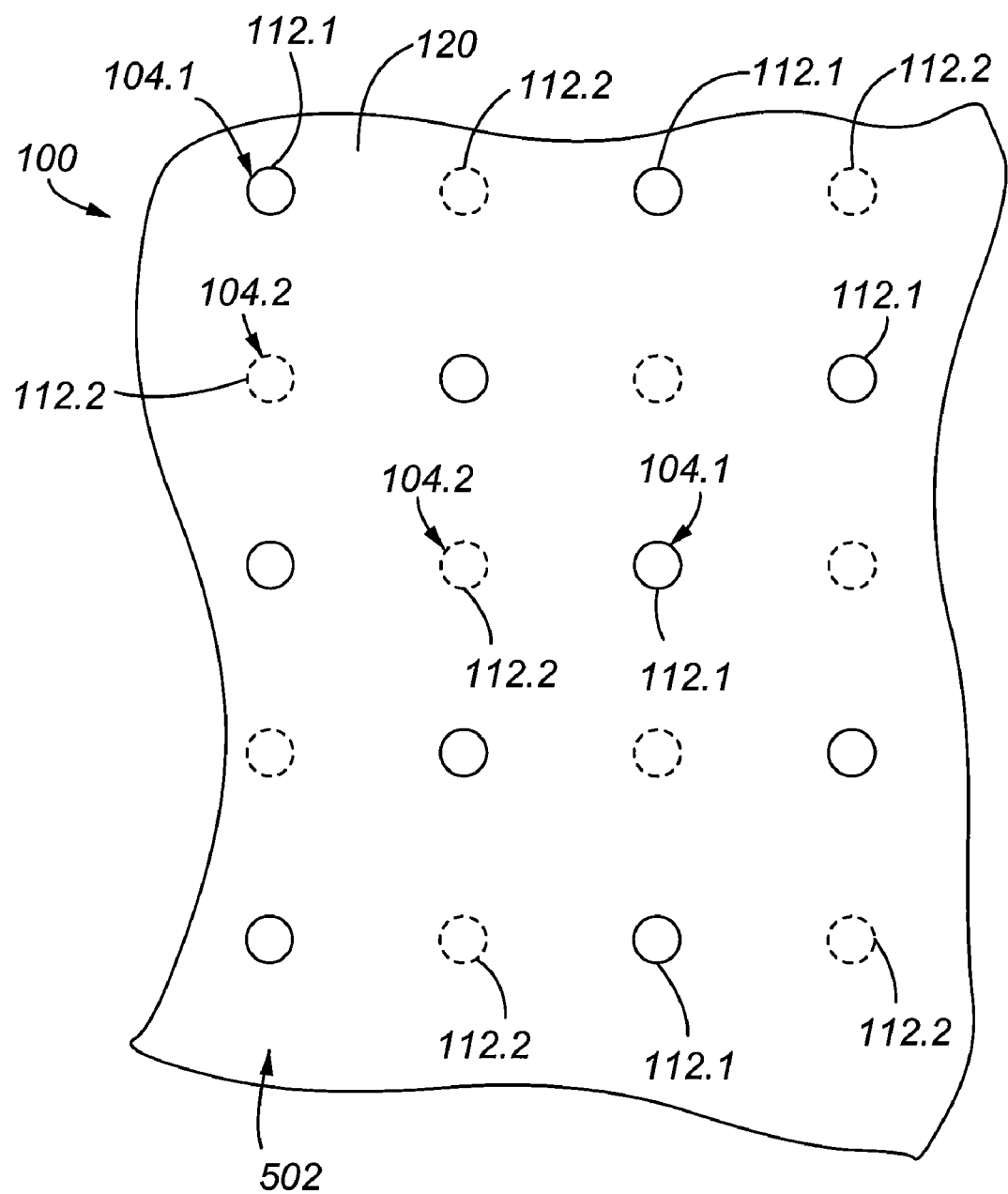
FIG. 8 is a plan view of a portion of the embodiment of the invention illustrated in FIG. 5.

FIG. 8 is an illustration of the IMLI structure 100 of FIG. 5, in plan view and taken along section line 8-8 of FIG. 5. As depicted in FIG. 8, the post elements 112.1 of a first course or layer of the IMLI structure 100 alternate with the post elements 112.2 of a second course or layer.

Figure 6:
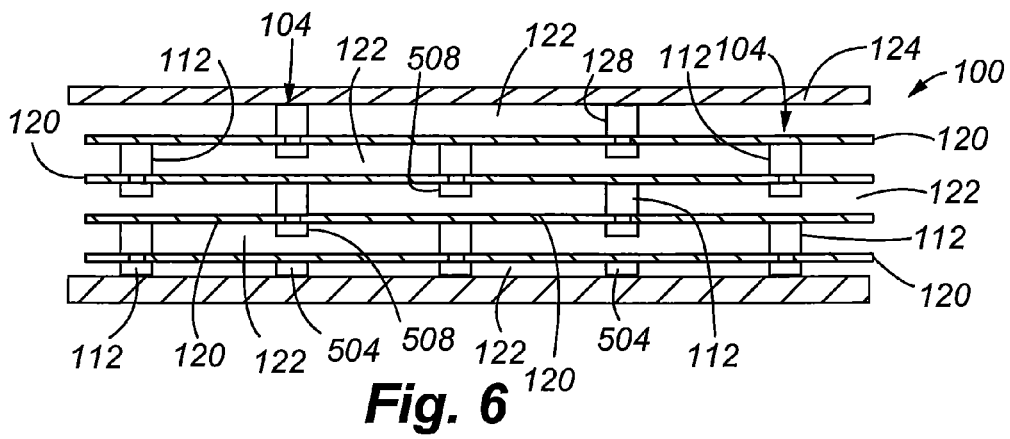
FIG. 6 is a cross section of the staggered post arrangement with a hermetic outer layer.

FIG. 6 illustrates the IMLI structure 100 of FIG. 5 being used to support a hermetic outer layer 124 while the IMLI structure 100 is itself supported by a tank or other structure comprising the base layer 108. A high vacuum is acquired between the insulation layers 120. As shown in FIG. 6, when there is no atmospheric pressure on the outside of the hermetic layer 124, the sheets 120 are approximately flat and the post elements 112 within each support post 104 are separated from each other, breaking conductive paths that would otherwise exist between post elements 112.

Figure 7:
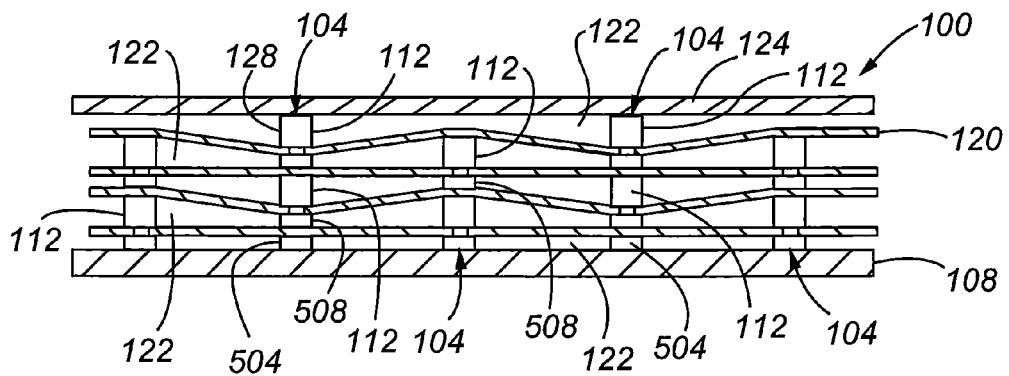
FIG. 7 is a cross section of the staggered post arrangement with a hermetic outer layer compressed by an external load.

When there is atmospheric pressure on the outer hermetic layer 124, the IMLI structure 100 is compressed until the post elements 112 within each support post 104 support each other to transfer the load of the atmosphere on the hermetic layer 124 to the base layer 108 as shown in FIG. 7. In accordance with embodiments of the present invention, the size of the post elements 112 and their spacing is sufficient to support a one atmosphere load when the insulation 100 is in the compressed configuration, while preventing contact between adjacent sheets 120. As illustrated, the partial posts 504 prevent direct contact and maintain a volume 122 between the base structure or layer 108 and the first sheet 120 for those posts 104 that do not have a post element interconnected to the first sheet 120. In addition, post elements 112 may include an extension 508 to prevent direct contact between sheets 120. When the atmospheric load is reduced such as in spaceflight, the polymer sheets 120 elastically return to a flat shape, and the post elements 112 separate from each other as shown in FIG. 6. This reduces the heat transfer between layers and allows for higher insulation performance during spaceflight.

Figure 9:
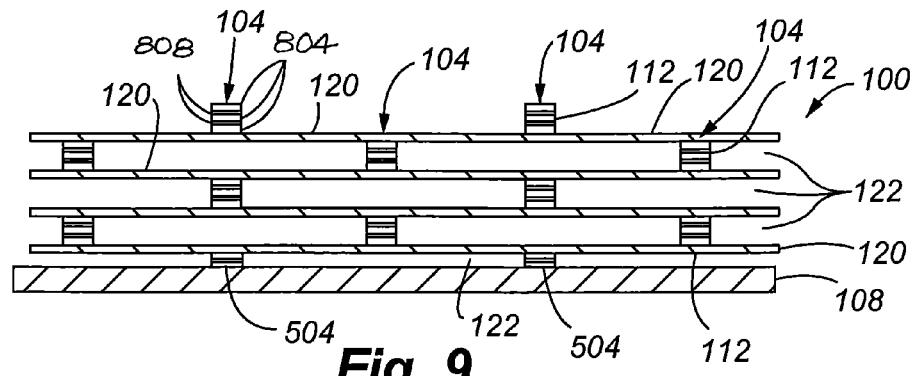
FIG. 9 is a cross section of another alternative embodiment of the invention in which the posts are configured with post elements that are in a staggered arrangement and are adhered to the sheets but are not interconnected to each other.

With reference now to FIG. 9, an IMLI structure 100 in accordance with other embodiments of the present invention is illustrated. In particular, the structure 100 illustrated in FIG. 9 includes post elements 112 that are configured in a staggered arrangement, similar to the embodiment illustrated in FIG. 6. However, in FIG. 9 each of the post elements 112 are adhered to a surface of a radiation shield of sheet 120, rather than being mechanically attached to the sheet 120. Moreover, in this embodiment, the sheets 120 are not perforated, and thus a post element 112 does not extend to either side of the sheet 120 to which it is attached. Alternatively, a post element 112 adhered to one side of a sheet 120 can be paired with a partial post element 504 or an extension 508 adhered to the opposite side of the sheet so that in profile the post element 112 appears like the post elements as shown in FIG. 5, but no perforations in the sheets 120 are required. By eliminating perforations in the sheets 120, thermal radiation through the IMLI structure 100 is reduced as compared to embodiments in which the sheets 120 are perforated.

In addition, the embodiment of the IMLI structure 100 illustrated in FIG. 9 features post elements 112 that have been metalized. In accordance with embodiments of the present invention, a thin (e.g., 100 Å) layer of aluminum, gold, silver or other metal may be deposited on the surface of the post elements 112 to reduce the infrared absorption of the post element 112 as compared to an un-metalized post element 112. By reducing the infrared absorption of the post elements 112, the insulation performance of the structure 100 can be improved. The metallization of post elements 112 may comprise the formation or provision of a metal layer 804 that covers all or substantially all of the exposed surface of the post elements 112. As used herein, substantially all of the exposed surface of a post element 112 comprises at least most of the surface of a post element 112 that is not adhered to or in contact with a sheet 120. The metallization of the post elements 112 can be patterned, so that gaps 808 are formed in the layer of metal 804, thereby interrupting the conductive path along the metalized surface. Accordingly, the degradation in the insulation performance of the IMLI structure 100 caused by creating conductive paths along the post elements 112 due to metallization can be reduced. In accordance with embodiments of the present invention, the layer of metal 804 is created using vapor deposition techniques. The gaps 808 in the metal layer 804 can be formed by masking the post elements 112 during vapor deposition, or by removing portions of the metal layer 804 by etching or mechanical processes. Similar processes can be used to create gaps in a metal layer formed on beams 204 for embodiments that include beams 204.

Figure 10:
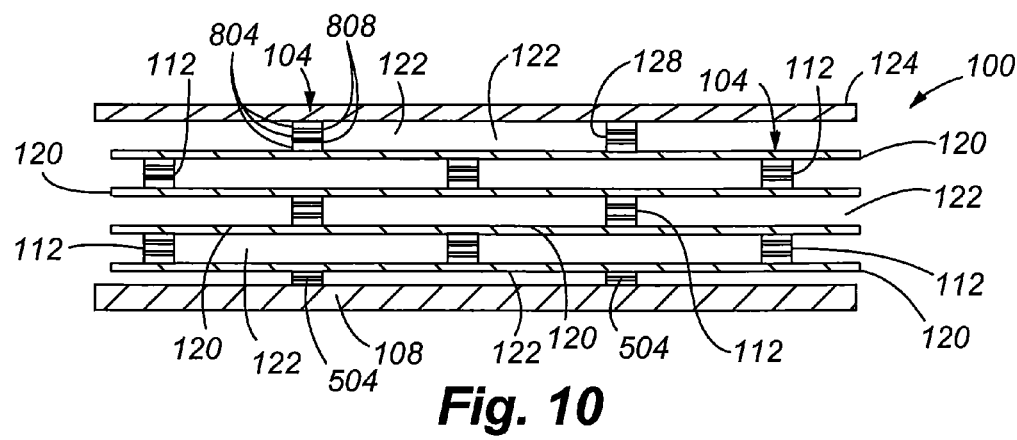
FIG. 10 is a cross section of the other staggered post arrangement with a hermetic outer layer.

FIG. 10 illustrates the IMLI structure 100 of FIG. 9 being used to support a hermetic outer layer 124 while the IMLI structure 100 is in turn supported by a tank or other structure 108. A high vacuum is obtained in the spaces 122 between sheets 120. In addition, FIG. 10 illustrates the configuration of the IMLI structure 100 in the absence of atmospheric pressure. In particular, the support posts 104 are segmented, breaking conductive paths that would otherwise exist along the support posts 104 because of the lack of a compressive load on the IMLI structure 100 when there is no atmospheric pressure on the outside of the hermetic layer 124. More particularly, gaps between the post elements 112 of the support posts 104 are created when the pressure or atmospheric load on the IMLI structure 100 is reduced or removed and the sheets 120 elastically return to a flat (or flatter) configuration.

Figure 11:
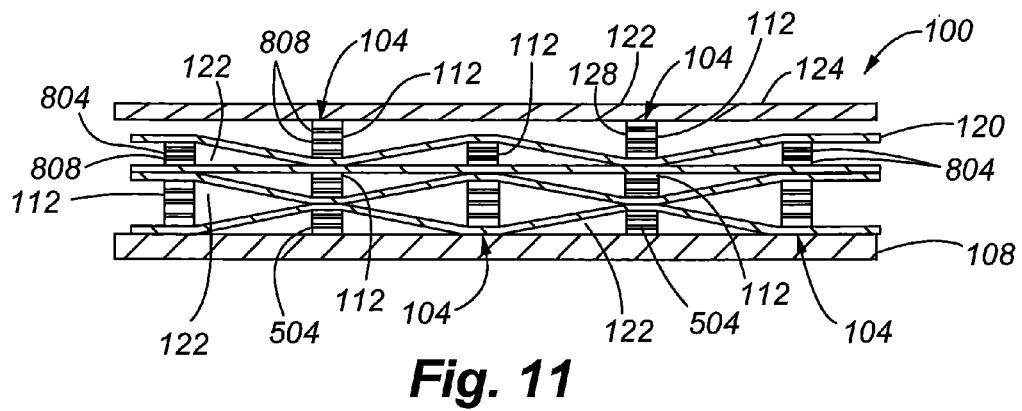
FIG. 11 is a cross section of the other staggered post arrangement with a hermetic outer layer compressed by an external load.

FIG. 11 illustrates the IMLI structure 100 of FIG. 10, when the structure 100 is subject to atmospheric pressure. In particular, the IMLI structure 100 is compressed until the post elements 112 of the support posts 104 support one another. Accordingly, even though the space between the hermetic layer 124 and the base structure or layer 108 is reduced, at least some of the volume and spacing between the sheets 120 of the IMLI structure 100 is maintained. Although the insulation performance of the structure 100 while under atmospheric load is somewhat reduced, due to the decreased spacing and the creation of conductive paths through the support posts 104, that performance is still close to the performance expected of the IMLI structure 100 when the atmospheric load is removed. As a result, the insulation performance and properties of the IMLI structure 100 can be better predicted even when the IMLI structure 100 is subject to such loads, as compared to conventional MLI structures.

Methods of forming an IMLI structure 100 in accordance with embodiments of the present invention include providing a plurality of sheets of material 120, each comprising a thermal radiation shield. In addition, a plurality of post elements are provided. A first set of post elements 112 included in the plurality of post elements 112 is interconnected to a first sheet 120 included in the plurality of sheets of material 120. A second sheet 120 is then registered with the first sheet and the first set of post elements 112, and the first set of post elements 112 is interconnected to the second sheet 120. A second set of post elements 112 is registered with the first set of post elements 112 and interconnected to the second sheet 120. In accordance with embodiments of the present invention featuring support posts 104 having post elements 112 that form a continuous, inline support post 104 configuration, registering the first and second sets of post elements includes aligning the first and second sets of post elements 112 so that they correspond to one another when the IMLI structure 100 is considered in plan view. In accordance with embodiments of the present invention in which the support posts 104 are in a staggered configuration, such that gaps along individual support posts 104 are created when the IMLI structure 100 is in a vacuum or otherwise not subjected to full atmospheric pressure, registering the first and second sets of post elements 112 includes aligning the first and second sets of post elements such that, when the IMLI structure 100 is considered in plan view, the first and second sets of post elements 112 do not approximately correspond to one another. Moreover, interconnecting post elements 112 to a sheet 120 can comprise inserting a portion of a post element 112 through a perforation in a sheet 120 and interconnecting that post element 112 to another post element 112 on the opposite side of the sheet 120. In accordance with other embodiments of the present invention, post elements 112 or a post element 112 and a post element extension 508 can be aligned with one another and adhered to opposite sides of a sheet 120. In accordance with still other embodiments of the present invention, post elements may be adhered or otherwise bonded to one or two sheets 120 forming the volume 120 in which the post element 112 is situated, while the side of the sheet or sheets 120 opposite the side to which the post element 112 is bonded does not have another post element 112 or extension 508 bonded to it opposite the first post element 112. As can be appreciated by one of skill in the art after consideration of the present disclosure, such methods for forming an IMLI structure 100 can be repeated until a desired number of sheets 120 have been interconnected to one another via post elements 112. If a base layer 108 and/or hermetic layer 124 are to be provided as part of the IMLI structure 100, that structure 100 can be completed by the inclusion and interconnection of such layers 108, 124 with the sheets 120.

For purposes of illustration, and without limitation, an exemplary IMLI structure 100 in accordance with embodiments of the present invention may feature a base layer 108 that is a sheet of metal or polymer that is about 10-20 mils thick. In addition, the first layer or course of post elements 112 can be molded into or as part of the base layer 108. The height of each post element body 308 can be about 40 to 80 mils, and the diameter of each post element 112 can likewise be about 40 to 80 mils. In accordance with embodiments of the present invention, the radiation shields or sheets 120 internal to the IMLI structure 100 can have a thickness of from about 0.10 to 2.0 mil. In accordance with further embodiments of the present invention, the radiation shields or sheets 120 internal to the IMLI structure 100 can have a thickness of from about 0.25 to 1.0 mil. The top or outer layer of insulation 124 can have a thickness of about 1.0 to 20 mils thick. The total number of sheets or layers 120 in the exemplary structure can be 5 to 10 layers with about 10 layers per centimeter of thickness. Additional structures of 5 to 10 layers can be added as required to achieve the required thermal insulation. As a further example, an IMLI structure 100 in accordance with embodiments of the present invention may have up to 100 layers 120. The spacing between adjacent support posts 104 can vary depending on the height of the post elements 112, thickness of the sheets 120, structural loads, the thermal performance requirements and other factors. In accordance with exemplary embodiments of an IMLI structure 100 as described herein, spacing between adjacent support posts 104 may be from about 1 cm to about 10 cm.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. An integrated multilayer insulation structure, comprising:
    a plurality of metalized sheets, wherein each metalized sheets comprises a thermal radiation shield;
    a plurality of support posts,
        wherein each support post included in the plurality of support posts includes a plurality of polymer post elements,
        wherein for each support post the plurality of post elements included in that support post are disposed along a line,
        wherein at least some post elements in each support post are interconnected to at least one of the plurality of metalized sheets,
        wherein a plurality of post elements are interposed between each pair of adjacent metalized sheets to create and maintain a spacing between adjacent metalized sheets, wherein the plurality of post elements interposed between each pair of adjacent metalized sheets are located within a volume at least partially defined by the adjacent metalized sheets.

2. The structure of claim 1, wherein for at least some of the support posts a post element is not interspersed between adjacent metalized sheets.

3. The structure of claim 2, further comprising:
    a hermetic layer;
    a base layer;
    wherein the post elements are adhered to at least the hermetic layer, the baselayer or one of the metalized sheets.

4. A multilayer thermal insulation structure, comprising:
    a plurality of sheets;
    a first support post, including:
        a first post element interconnected to a first sheet included in the plurality of sheets,
        wherein the first post element is at least one of in contact with or bonded to the first sheet,
        wherein the first post element is within a volume defined at least in part by the first sheet and an adjacent one of a second sheet included in the plurality of sheets and a third sheet included in the plurality of sheets, and
        wherein the first post element maintains a separation between, the first sheet and the one of the second sheet and the third sheet;
        a second post element interconnected to the second sheet,
        wherein the second post element is at least one of in contact with or bonded to the second sheet,
        wherein the second post element is within a volume defined at least in part by the second sheet and one of the third sheet and a fourth sheet included in the plurality of sheets,
        wherein the second post element maintains a separation between the second sheet and the one of the third sheet and the fourth sheet, and
        wherein at least the second sheet included in the plurality of sheets is interposed between the first post element and the second post element;
    a second support post, including:
        a first post element interconnected to the first sheet,
        wherein the first post element is at least one of in contact with or bonded to the first sheet,
        wherein the first post element is within the volume defined at least in part by the first sheet and an adjacent one of the second sheet included in the plurality of sheets and the third sheet included in the plurality of sheets, and
        wherein the first post element maintains a separation between the first sheet and the one of the second sheet and the third sheet;
    a second post element interconnected to the second sheet,
        wherein the second post element is at least one of in contact with or bonded to the second sheet, wherein the first post element is within a volume defined at least in part by the second sheet and one of the third sheet included in the plurality of sheets and the fourth sheet,
        wherein the second post element maintains a separation between the second sheet and the one of the third sheet and the fourth sheet, and
        wherein at least the second sheet included in the plurality of sheets is interposed between the first post element and the second post element.

5. The structure of claim 4, further comprising:
    a base post element included in the first support post;
    a base post element included in the second support post;
    a base layer, wherein the base layer is interconnected to the base post element of the first support post and to the base post element of the second support post.

6. The structure of claim 5, further comprising:
    a top post element included in the first support post;
    a top post element included in the second support post;
    a hermetic layer, wherein the hermetic layer is interconnected to the top post element of the first support post and to the top post element of the second support post.

7. The structure of claim 4, further comprising:
a third support post, including:
- a first post element interconnected to the third sheet, wherein the third sheet is disposed between the first sheet and the second sheet, wherein the first post element is within a volume defined at least in part by the second sheet and the third sheet, and wherein the first post element maintains a separation between the second sheet and the third sheet;
- a second post element interconnected to the fourth sheet included in the plurality of sheets,
- wherein the first post element of the first support post and the first post element of the second support post are within a volume defined at least in part by the first sheet and the third sheet,
- wherein the first post element of the first support post and the first post element of the second support post maintain a separation between the first sheet and the third sheet,
- wherein the second post element of the first support post and the second post element of the second support post is within the volume defined at least in part by the second sheet and the fourth sheet,
- wherein the second post element of the first support post and the second post element of the second support post maintain a separation between the second sheet and the fourth sheet.

8. The structure of claim 7, further comprising:
a fourth support post, including:
- a first post element interconnected to the third sheet;
- a second post element interconnected to the fourth sheet included in the plurality of sheets,
- wherein the first support post, the second support post, the third support post and the fourth support post are disposed along a line, wherein the third support post is interposed between the first and second support posts, and wherein the second support post is interposed between the third and fourth support posts.

9. The structure of claim 8, further comprising:
a first beam, wherein the first beam is interconnected to the first post element of the first support post and the first post element of the second support post;
a second beam, wherein the second beam is interconnected to the first post element of the third support post and the first post element of the fourth support post.

10. The structure of claim 4, further comprising:
a first beam, wherein the first post element of the first support post and the first post element of the second support post are interconnected to one another by the first beam.

11. The structure of claim 4, wherein the post elements have an outer surface comprising a layer of metal.

12. The structure of claim 11, wherein gaps are formed in the layer of metal.

13. The structure of claim 4, wherein the first post element of the first support post and the first post element of the second support post are within a volume defined at least in part by the first sheet and the second sheet, wherein the first post element of the first support post and the first support element of the second support post maintain a separation between the first sheet and the second sheet, wherein the second post element of the first support post and the second post element of the second support post is within the volume defined at least in part by the second sheet and the third sheet, wherein the second post element of the first support post and the second post element of the second support post maintain a separation between the second sheet and the third sheet, wherein the first post element of the first support post and the first post element of the second support post are at least one of in contact with or bonded to a first side of the first sheet, and wherein the second post element of the first support post and the second post element of the second support post are at least one of in contact with or bonded to a second side of the first sheet.

14. The structure of claim 13, wherein the first post element of the first support post is bonded to at least the first sheet,
- wherein the second post element of the first support post is bonded to at least the second sheet,
- wherein the first post element of the second support post is bonded to at least the first sheet, and
- wherein the second post element of the second support post is bonded to at least the second sheet.

15. The structure of claim 14, wherein the first and second sheets are not perforated.

16. The structure of claim 13, wherein the first post elements have a height that determines the separation between the first and second sheets adjacent the first post elements, and wherein the first post elements have a diameter that is no greater than a height of the first and second post elements.

17. The structure of claim 4, wherein the first and second post elements of the first and second support posts are formed from a first material, and wherein each sheet in the plurality of sheets is formed from a second material that is different than the first material.

18. The structure of claim 8, further comprising:
- a top post element included in the third support post, wherein the top post element included in the first support post is interconnected to the first sheet;
- a top post element included in the fourth support post, wherein the top post element included in the second support post is interconnected to the first sheet;
- a hermetic layer, wherein the hermetic layer is interconnected to the top post element of the third support post and to the top post element of the fourth support post, and wherein at least the volume defined at least in part by the first and second sheets is evacuated to less than $10^{-2}$ Pa.

19. The structure of claim 18, wherein in the presence of atmospheric pressure on the hermetic layer, the first and third sheets are in contact with one another at least in an area between the top post element of the third support post and the first post element of the third support post and between the top post element of the fourth support post and the first post element of the fourth support post, and wherein the second and fourth sheets are in contact with one another at least in the areas between the first post element of the third support post and the second post element of the third support post, and between the first post element of the fourth support post and the second post element of the fourth support post.

20. The structure of claim 4, wherein at least the volume defined at least in part by the first and second sheets is evacuated to less than 10-2 Pa.

21. The structure of claim 4, wherein each post element is a rigid polymer.

22. The structure of claim 4, wherein each post element is a molded polymer.

* * * * *